(12) United States Patent
Kishi

(10) Patent No.: US 7,661,193 B2
(45) Date of Patent: Feb. 16, 2010

(54) METHOD FOR MANUFACTURING FLOAT VALVE APPARATUS

(75) Inventor: Morihiko Kishi, Kanagawa (JP)

(73) Assignee: Piolax Inc., Yokohama-shi, Kanagawa-ken (JP)

(*) Notice: Subject to any disclaimer, the term of this patent is extended or adjusted under 35 U.S.C. 154(b) by 454 days.

(21) Appl. No.: 10/885,893

(22) Filed: Jul. 8, 2004

(65) Prior Publication Data

US 2005/0022383 A1 Feb. 3, 2005

(30) Foreign Application Priority Data

Jul. 10, 2003 (JP) .................... P. 2003-272718

(51) Int. Cl.
*B21K 1/20* (2006.01)
*B23K 20/12* (2006.01)

(52) U.S. Cl. .............. 29/890.126; 228/114.5; 228/2.3

(58) Field of Classification Search ............ 29/890.126; 228/112.1, 114.5, 2.1, 2.3; 137/202
See application file for complete search history.

(56) References Cited

U.S. PATENT DOCUMENTS 3,993,519 A * 11/1976 Birkhold ............... 156/73.5
5,833,127 A * 11/1998 Powell et al. ............... 228/102
6,422,261 B1 * 7/2002 DeCapua et al. ............ 137/202

FOREIGN PATENT DOCUMENTS

| JP | 5-30654 | 4/1993 |
| JP | 2000-154763 | 6/2000 |
| JP | 2002-332925 | 11/2002 |

OTHER PUBLICATIONS

Japanese Office Action dated Dec. 9, 2008, with an English translation.

* cited by examiner

*Primary Examiner*—David P Bryant
*Assistant Examiner*—Sarang Afzali
(74) *Attorney, Agent, or Firm*—McGinn IP Law Group PLLC (57) ABSTRACT

In a method for manufacturing a float valve apparatus including a valve case, an upper lid incorporated into this valve case to form a valve chamber, and a float valve liftably arranged inside the valve chamber, the upper lid being provided with a lead-out pipe connected to piping of the outside, an exhaust hole which communicates with this lead-out pipe and is opened in an inner surface of the upper lid, and a seal cap which is mounted so as to enclose this exhaust hole and forms a valve seat on which the float valve abuts, the seal cap is welded to an inner surface of the upper lid by spin welding.

17 Claims, 6 Drawing Sheets

METHOD FOR MANUFACTURING FLOAT VALVE APPARATUS

BACKGROUND OF THE INVENTION

1. Field of the Invention

The present invention relates to a float valve apparatus suitable for a fuel shutoff valve etc. for preventing fuel from flowing out the outside of a fuel tank when a liquid level of the fuel tank of, for example, an automobile rises.

2. Description of the Related Art

As a conventional float valve apparatus, a fuel outflow prevention valve of a vehicle characterized in that in a fuel outflow prevention valve of a vehicle including a tubular valve chamber in which an upper lid wall is had and the lower end is blocked by a filter and an exhaust hole of fuel vapor is upward opened in the center of the upper lid wall, a connection pipe integrally provided radially outward on the upper lid wall of the tubular valve chamber and in perpendicular communication with the upper end of the exhaust hole in the inner end, and a float which is vertically movably held in the tubular valve chamber and has a valve head capable of blocking the lower end of the exhaust hole in an upper surface, an inside diameter of the exhaust hole is made equal to an inside diameter of the connection pipe and also a valve seat ring with an inside diameter smaller than that of the exhaust hole is mounted in the lower end of the exhaust hole blocked by the valve head of the float is disclosed in the following JP-UM-A-5-30654. Then, a joint between the valve seat ring and the exhaust pipe end of the tubular valve chamber forming the fuel outflow prevention valve described above is performed by welding through an ultrasonic welding apparatus.

The ultrasonic welding apparatus includes, for example, an ultrasonic vibrator which is a generation source of vibration energy on the longitudinal axis, a pressure mechanism, a horn set in the pressure mechanism, and a jig for receiving a workpiece.

Therefore, when the valve seat ring is welded using the ultrasonic welding apparatus, the horn is vertically vibrated by vibration energy generated from the ultrasonic vibrator and this horn is abutted on the valve seat ring and the valve seat ring is pushed to the tubular valve chamber and thereby, frictional heat is generated between the valve seat ring and the tubular valve chamber and the mutual members melt each other and weld.

In ultrasonic welding between the valve seat ring and the exhaust hole end of the tubular valve chamber shown in the JP-UM-A-5-30654, the valve seat ring is welded to the tubular valve chamber by vertical vibration transferred from the horn, so that there was a possibility that the valve seat ring is welded at an angle with respect to the tubular valve chamber. Also, there was a possibility that the valve seat ring slips laterally and the center of a hole of the valve seat ring slips from the center of the float. Further, there was a possibility that due to heat generated at the time of ultrasonic vibration, a hole of the valve seat ring is deformed and its circularity reduces.

In such cases, performance of sealing between the valve seat ring and the float cannot be obtained sufficiently and as a result, here was a problem that leakage of liquid may occur.

SUMMARY OF THE INVENTION

An object of the invention is to provide a method for manufacturing a float valve apparatus constructed so that adhesion of a seal surface at the time of valve blockage is improved and occurrence of leakage of liquid is minimized.

In order to achieve the object, a first invention provides a method for manufacturing a float valve apparatus including a valve case, an upper lid incorporated into this valve case to form a valve chamber, and a float valve liftably arranged inside the valve chamber, the lid body being provided with a lead-out pipe connected to piping of the outside, an exhaust hole which communicates with this lead-out pipe and is opened in an inner surface of the upper lid, and a seal cap which is mounted so as to enclose this exhaust hole and forms a valve seat on which the float valve abuts, characterized in that the seal cap is welded to an inner surface of the upper lid by spin welding.

According to the invention described above, spin welding in which the seal cap is crimped to the upper lid and the seal cap is relatively rotated with respect to the upper lid and thereby frictional force is generated between the seal cap and the upper lid and the mutual members are melted and joined by heat energy at a that time is adopted as a method of welding of the seal cap to the upper lid. As a result of that, since the seal cap is welded while rotating in a circumferential direction rather than vertical vibration as shown in ultrasonic welding, a situation in which the seal cap is welded at an angle resists occurring and also the entire circumference of the seal cap is uniformly welded to the upper lid, so that adhesive strength or sealing performance improves.

In the first invention, a second invention provides a method for manufacturing a float valve apparatus wherein a cylindrical rib for enclosing the exhaust hole is formed in an inner surface of the upper lid and a circumferential wall for fitting into the rib is provided in the seal cap and a melting part melted in the case of the spin welding is provided in a surface of contact between the rib of the upper lid and the circumferential wall of the seal cap.

According to the invention described above, the seal cap is relatively rotated with respect to the lid body in a state in which the rib of the upper lid is in circular contact with the circumferential wall of the seal cap, so that the circular contact portion results in a rotary guide, and inclination and a lateral slip are prevented and the center of an air vent of the seal cap can be installed accurately.

In the first or second invention, a third invention provides a method for manufacturing a float valve apparatus wherein it is constructed so that a double cylindrical wall for enclosing a rib of the upper lid is provided in a circumferential wall of the seal cap and the melting part is provided in either an inner wall or an outer wall of this double cylindrical wall and burrs occurring in the case of welding are contained by the other wall of the double cylindrical wall.

According to the invention described above, unnecessary products such as non weld burrs occurring in the case of spin welding can be contained in a gap formed by the double cylindrical wall of the seal cap. As a result of that, disadvantages in which burrs occurring in the case of spin welding spatter and are pinched between seal surfaces of a valve body can be avoided.

According to the invention, in the case of manufacturing a float valve apparatus, spin welding in which a seal cap is crimped to a lid body and the seal cap is relatively rotated with respect to an upper lid and thereby frictional force is generated between the seal cap and the upper lid and the mutual members are melted and joined by heat energy at that time is adopted as a method of welding of the seal cap to the upper lid, and thereby inclination of the seal cap is prevented and also the entire circumference of the seal cap can be uniformly welded to the lid body and sealing performance or adhesive strength can be improved.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

An embodiment of the invention will be described below based on the drawings.

Figure 1:
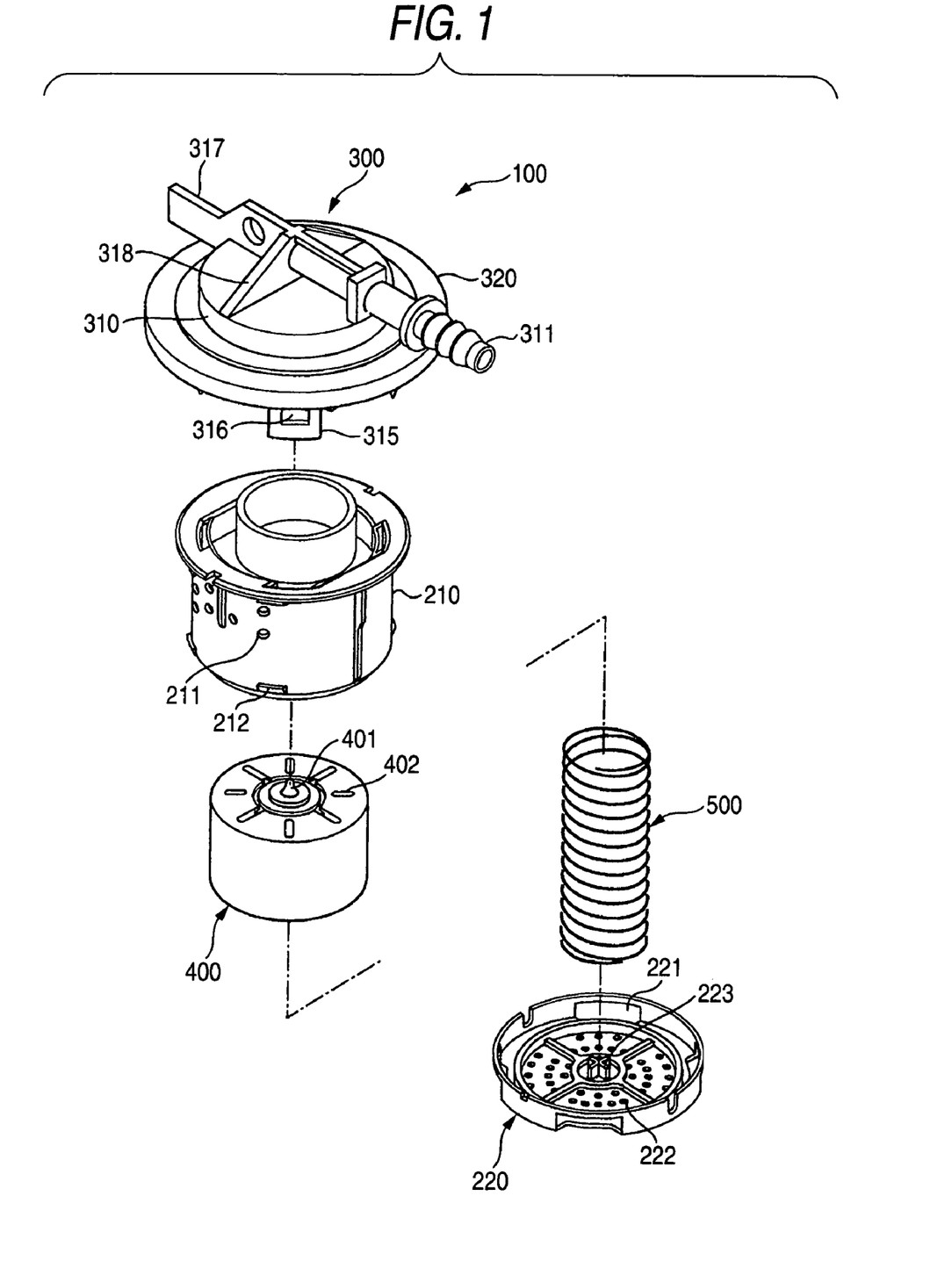
FIG. 1 is an exploded perspective view of a float valve apparatus.
Figure 2:
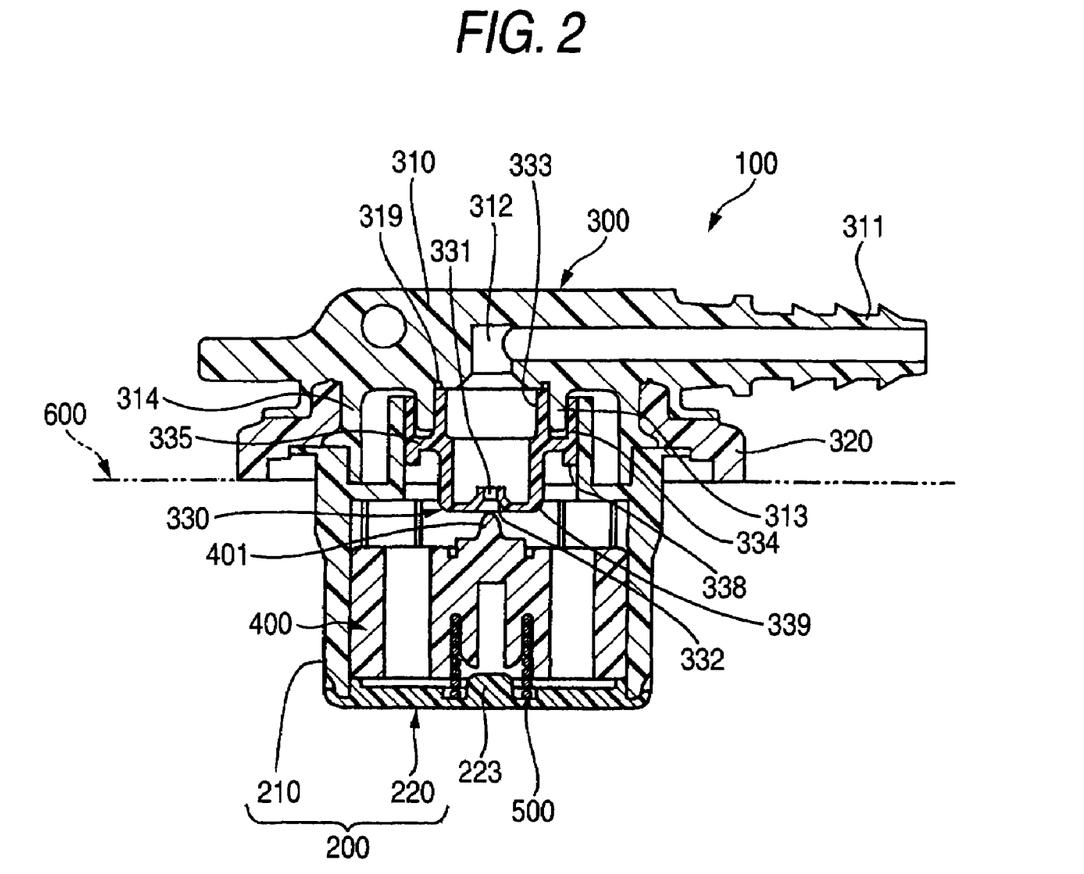
FIG. 2 is a sectional view showing a state in which the float valve apparatus is mounted in a fuel tank.
Figure 3A:
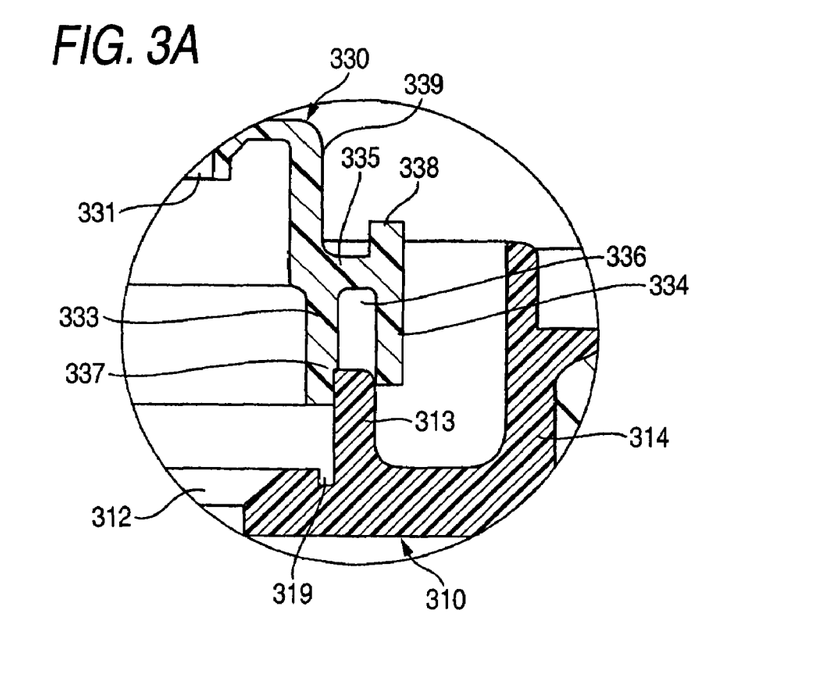
FIGS. 3A and 3B are enlarged sectional views of a weld part in the case of spin welding a seal cap to a lid body.
Figure 3B:
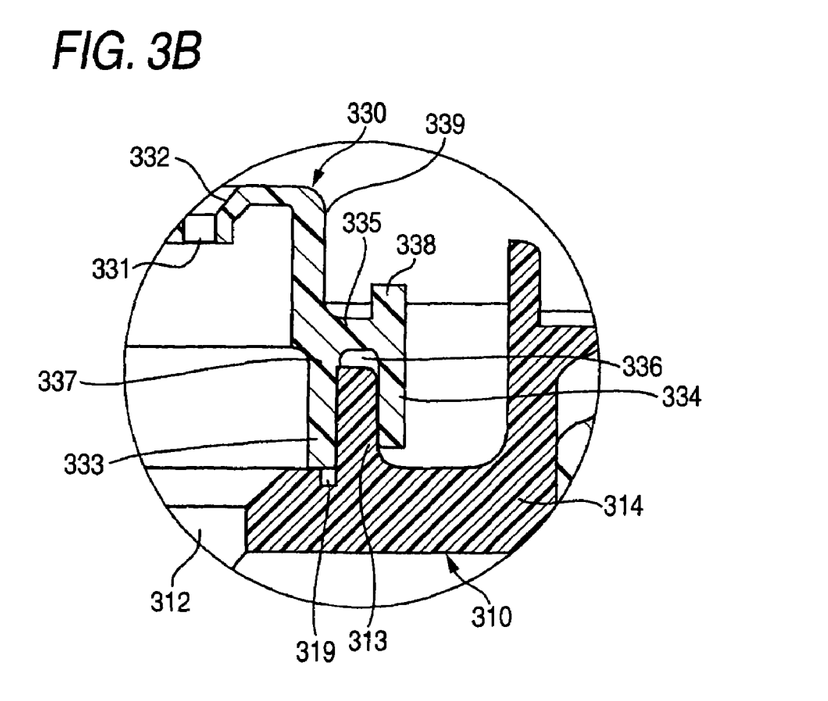
Figure 4:
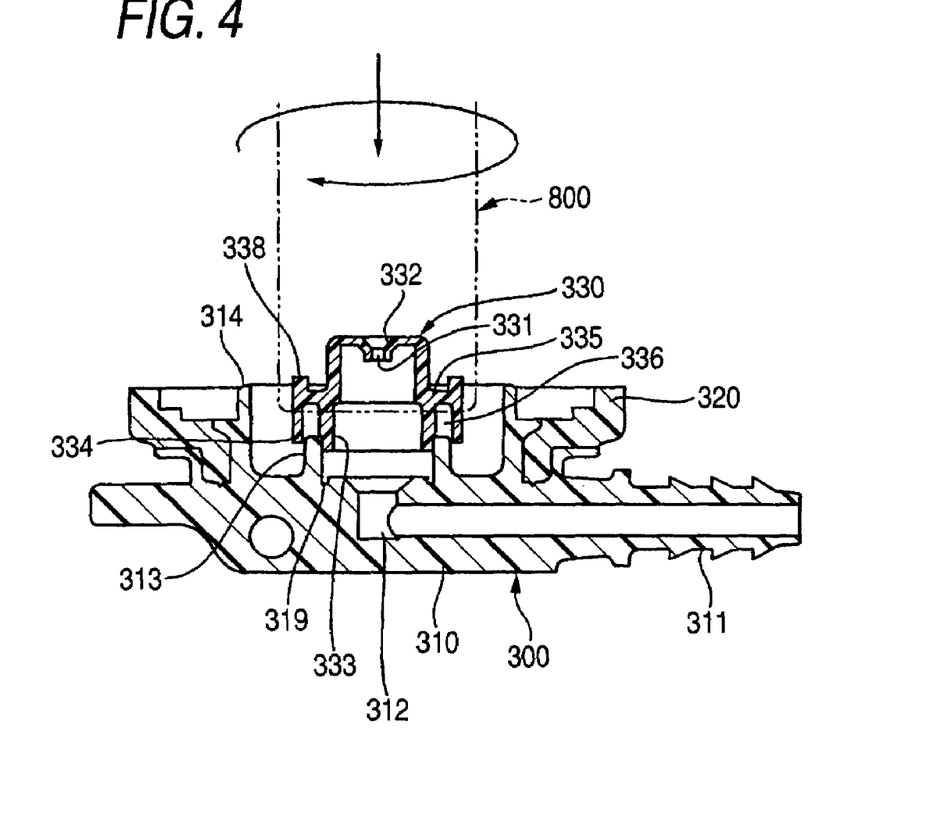
FIG. 4 is a sectional view showing a state before spin welding in the case of spin welding the seal cap to the lid body.
Figure 5:
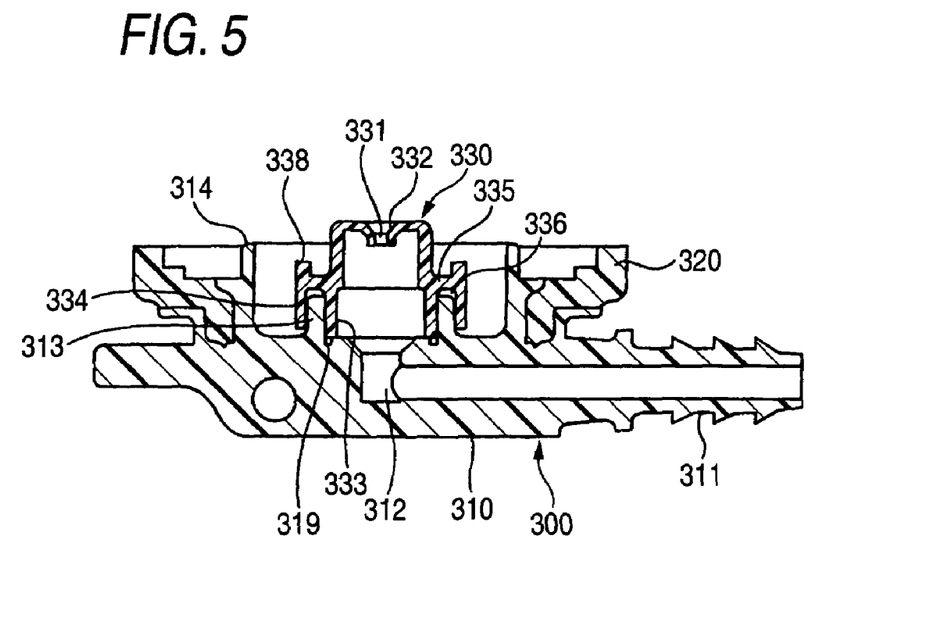
FIG. 5 is a sectional view showing a state after spin welding in the case of spin welding the seal cap to the lid body.
Figure 6:
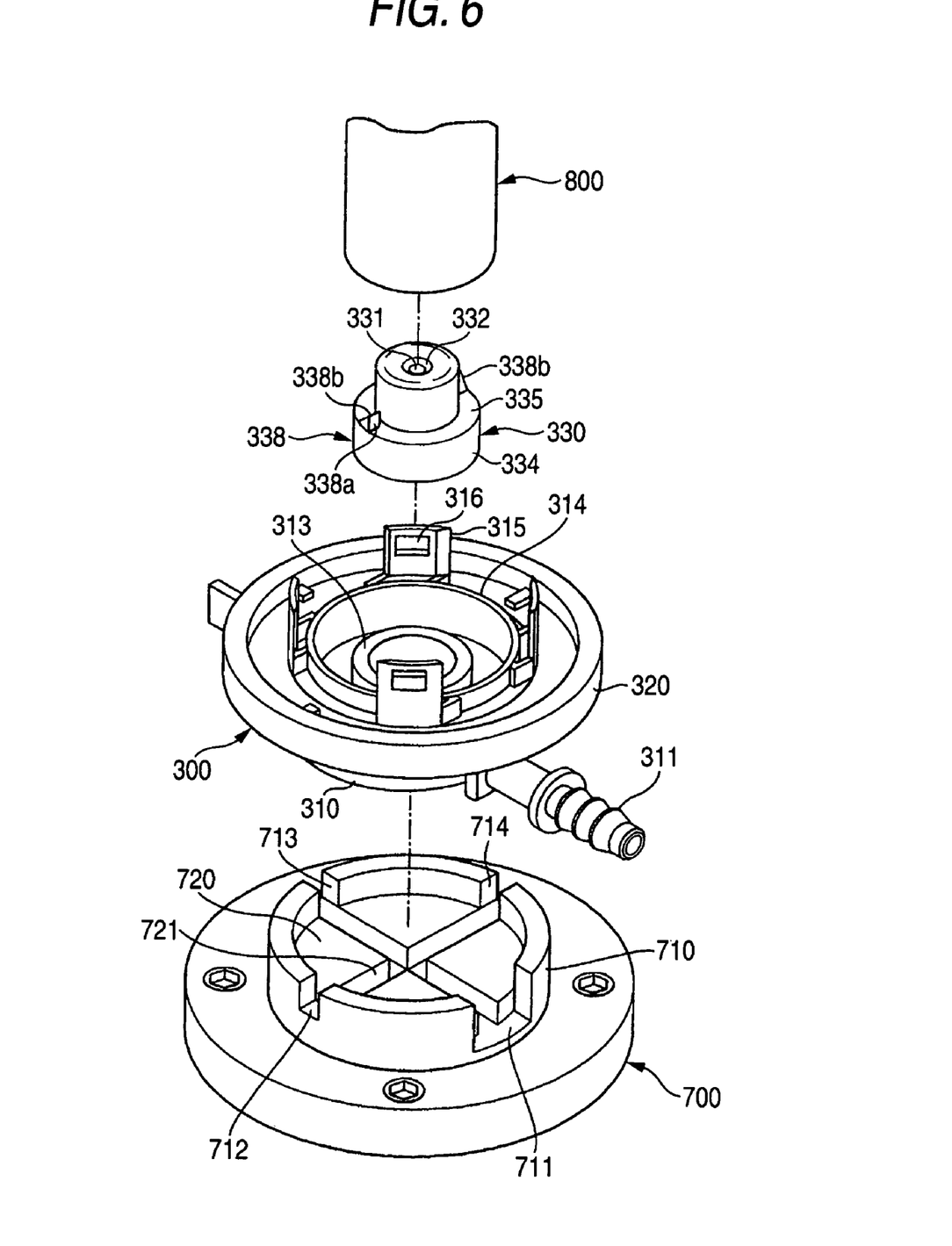
FIG. 6 is a perspective view showing a welding method of the seal cap by a spin welding apparatus.
Figure 7:
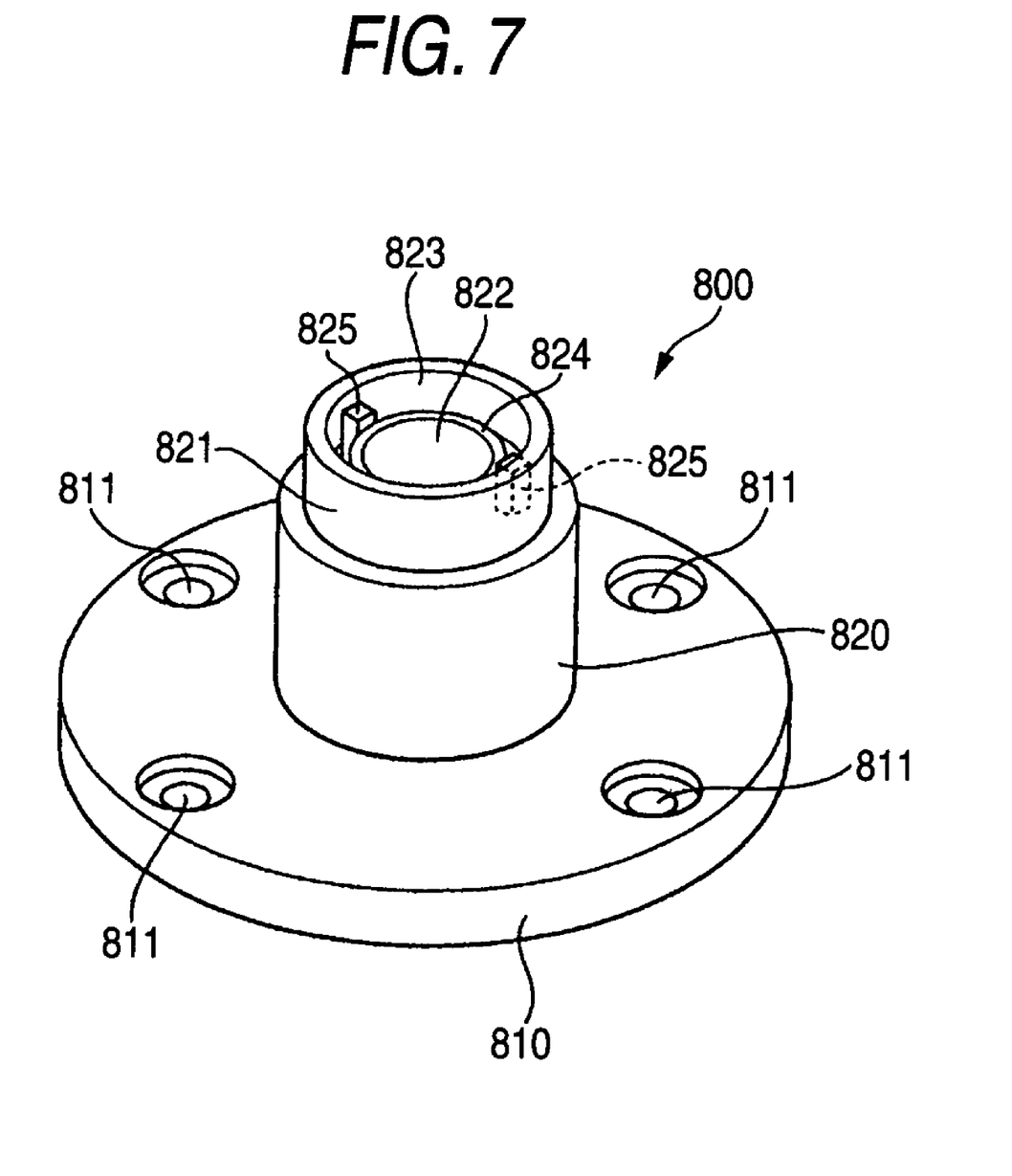
FIG. 7 is a perspective view showing a rotary holder of the spin welding apparatus.

One embodiment of a float valve apparatus manufactured by the invention is shown in FIGS. 1 to 7. FIG. 1 is an exploded perspective view of a float valve apparatus, and FIG. 2 is a sectional view showing a state in which the float valve apparatus is mounted in a fuel tank, and FIGS. 3A and 3B are enlarged sectional views of a weld part in the case of spin welding a seal cap to a lid body and FIG. 3A is an enlarged sectional view before welding and FIG. 3B is an enlarged sectional view after welding, and FIG. 4 is a sectional view showing a state before spin welding in the case of spin welding the seal cap to the lid body, and FIG. 5 is a sectional view showing a state after spin welding in the case of spin welding the seal cap to the lid body, and FIG. 6 is a perspective view showing a welding method of the seal cap by a spin welding apparatus, and FIG. 7 is a perspective view showing a rotary holder of the spin welding apparatus.

As shown in FIG. 1, in this float valve apparatus 100, a valve case 200 (see FIG. 2) is formed of a tubular case 210 and a lower cap 220 for blocking an opening of a lower surface of the tubular case.

An upper lid 300 is mounted in an opening of an upper surface of this valve case 200. A float valve 400 is vertically movably arranged in a valve chamber enclosed with the valve case 200 and the upper lid 300.

A spring 500 is interposed between the float valve 400 and the lower cap 220, and upward energization force is always applied to the float valve 400.

Water passage holes 211 for water passage are reformed in a circumferential wall of the tubular case 210. Also, plural pawls 212 are formed in the lower edge of the tubular case 210.

On the other hand, engagement holes 221 are formed in the lower edge of a circumferential wall of the lower cap 220 and in the case of being incorporated into a lower surface of the tubular case 210, the pawls 212 engage with the engagement holes 221 and the lower cap 220 is joined to the tubular case 210.

Also, water passage holes 222 are formed in a bottom wall of the lower cap 220. Further, a protrusion 223 for supporting the lower end of the spring 500 is formed in the center of an inner surface of the bottom wall.

The float valve 400 has a protrusion-shaped valve head 401 for blocking a valve seat 332 of a seal cap 330 described below in the center of an upper surface. Also, slit-shaped water permeable holes 402 penetrating vertically are formed in plural circumferential places enclosing the valve head 401 of the float valve 400.

Referring to FIG. 2 in combination, the upper lid 300 includes a lid body 310, a flange part 320 insert molded in the periphery of a lower surface of the lid body 310, and a seal cap 330 joined in the center of an inner surface of the lid body 310.

The lid body 310 has a lead out pipe 311 extended outward in a radial direction on the upper surface. Also, as shown in FIG. 1, a rib 317 formed along an axial direction of the lead-out pipe 311 is formed in the lid body 310. Further, another rib 318 formed so as to intersect perpendicularly to the rib 317 is formed.

The inner end of an air vent of the lead-out pipe 311 communicates with an exhaust hole 312 which is opened in the center of an inner surface of the lid body 310 and extends upward.

A cylindrical rib 313 is formed in the circumferential edge of an opening of the exhaust hole 312 opened in the center of the inner surface of the lid body 310. Further, a burr receiving groove 319 made of an annular groove is formed in a base of the inner circumference of the cylindrical rib 313.

On the other hand, the flange part 320 is insert molded in the lid body 310.

The seal cap 330 has a cylindrical shape with the bottom as a whole, and an air vent 331 protrusively formed in cylindrical rib shape inward is formed in the center of the bottom. A valve seat 332 having a tapered recess is formed in the opening circumferential edge of the bottom of this air vent 331.

Then, it is constructed so that when the float valve 400 rises, the valve head 401 makes close contact with this valve seat 332 and the air vent 331 is closed.

A circumferential wall of the seal cap 330 includes a single cylindrical part 339 standing from the bottom, and a double cylindrical part formed by an inner wall 333 and an outer wall 334 through a diameter expansion step 335 from this single cylindrical part. That is, the circumferential wall in the invention is constructed of the single cylindrical part 339, the diameter expansion step 335, the inner wall 333 and the outer wall 334.

Also, an annular groove 336 for receiving the cylindrical rib 313 of the upper lid is constructed of the inner wall 333, the diameter expansion step 335 and the outer wall 334.

Referring to FIGS. 3A and 3B in combination, a diameter expansion step 337 engaging with the rib 313 of the lid body 310 is formed in an inner surface located in the side of the annular groove 336 of the inner wall.

The cylindrical rib 313 of the lid body 310 engages with the diameter expansion step 337 when the rib 313 is inserted into the annular groove 336 of the seal cap 330.

Then, it is constructed so that by spin welding described below, rotation and welding are performed in a place of the diameter expansion step 337 and resin melts and the cylindrical rib 313 moves in the annular groove 336 and thereby the seal cap 330 is welded to the lid body 310 as shown in FIG. 3B.

On the other hand, protrusions 338 for engaging with a rotary holder 800 of a spin welding apparatus described below are formed on an outer surface of the diameter expansion step 335 of the seal cap 330. The protrusions 338 are formed in two places opposed in a circumferential direction of the diameter expansion step 335.

In this protrusion 338, one surface of the protrusion 338 forms a surface 338a standing perpendicularly to the diameter expansion step 335 and the opposite surface forms a surface 338b inclined to the diameter expansion step 335.

Also, as shown in FIG. 6, a cylindrical rib 314 located in the further outside of the cylindrical rib 313 of the opening circumferential edge of the exhaust hole 312 is formed in an inner surface of the lid body 310. Tongues 315 are uprightly provided in four places of a circumferential direction of this cylindrical rib 314.

An engagement hole 316 for engaging with a pawl (not shown) formed in the opening circumferential edge of the upper end of the tubular case 210 is formed in this tongue 315. Then, the pawls of the tubular case 210 engage with the engagement holes 316 of the tongues 315 of the tubular case 210 and thereby the tubular case is joined to the upper lid 300.

As material of each of the members described above, it is preferable to use material with good moldability and excellent solvent resistance. For example, resin material such as polyacetal or polyamide is used. Also, stainless steel is preferably used as the spring.

Also, the flange part 320 is preferably formed of material similar to that of a fuel tank, for example, olefin resin such as polyethylene since the flange part 320 is welded to the fuel tank (not shown).

Further, the same material is preferably used in the seal cap 330 and the lid body 310 of the upper lid 300 since the mutual members are melted and joined by spin welding. In the present embodiment, polyamide is used.

The float valve apparatus 100 constructed as described above is inserted through an opening formed in a wall surface of the fuel tank and is fixed in the circumferential edge of the opening by welding the flange part 320. In FIG. 2, an imaginary line 600 shows a position of the wall surface of the fuel tank (not shown).

Next, a method of spin welding will be described.

The upper lid 300 is installed on a positioning jig 700 with an inner surface of the upper lid turned upward as shown in FIG. 6.

This positioning jig 700 is previously mounted on a pedestal of a rotary welding apparatus (not shown). Also, the positioning jig 700 has a cylindrical rib 710 in the center of an upper surface. The cylindrical rib 710 has four notches 711, 712, 713, 714 formed at spaced angles of 90° in four places of a circumferential direction of the cylindrical rib.

One notch 711 among them is formed by a width capable of inserting the lead-out pipe 311 of the upper lid 300. The other three notches 712, 713, 714 are formed by widths capable of inserting the ribs 317, 318, of the upper lid 300.

Further, a receiving part 720 is provided in the inside of the cylindrical rib 710, and a cross-shaped groove 721 in which both the ends are opened by the notches 711, 712, 713, 714 is formed in this receiving part 720.

Then, the upper lid is fixed and arranged with the inner surface turned upward by inserting the ribs 317, 318 of the upper lid into the notches 711, 712, 713, 714 and the groove 721 on the positioning jig 700.

Next, the seal cap 330 is incorporated into the upper lid 300 by fitting the annular groove 336 of the seal cap 330 into the cylindrical rib 313 arranged in the circumferential edge of the exhaust hole 312 of the upper lid 300.

In that state, a rotary holder 800 of a spin welding apparatus is moved down and the seal cap 330 is held.

The rotary holder 800 has a flange part 810 on a disk fixed in a rotating shaft of the spin welding apparatus (not shown) and a cylindrical part 820 protruded from the center of a lower surface of this flange part as shown in FIG. 7.

Plural mounting holes 811 are formed in the flange part 810 and it is constructed so as to be fixed in a rotating shaft (not shown) by inserting bolts into the mounting holes 811.

The cylindrical part 820 has a cylindrical part 821 whose diameter is further contracted in the top.

Also, a diameter contraction part 822 and a diameter expansion part 823 are provided in inner circumferences of the cylindrical parts 820 and 821. A step is provided between the diameter contraction part 822 and the diameter expansion part 823, and a cylindrical rib 824 is formed in an inner circumference of the step. Then, protrusions 825 protruded in prism shape are formed between the cylindrical rib 824 and the diameter expansion part 823 in two places opposed in a circumferential direction.

When such a rotary holder 800 is moved down toward an end face of the seal cap 330, the end face of the seal cap 330 moves in the inside of the rotary holder 800 and the lower end of the rotary holder 800 abuts on the diameter expansion step 335 of the seal cap 330.

At that time, the protrusions 825 of the rotary holder 800 are arranged in a position engaging with the protrusions 338 provided in the step of the seal cap 330 in a rotational direction.

In case that this protrusion 825 strikes the protrusion 338, the top of the protrusion 338 is sharp and one surface forms the inclined surface 338b, so that it spontaneously slides and rotates and the protrusions 825 move down to a position abutting on the diameter expansion step 335 of the seal cap 330.

When the spin welding apparatus is actuated to rotate the rotary holder 800 in a predetermined direction in this state, the protrusions 825 engage with the perpendicularly stood surfaces 338a of the protrusions 338 and the rotary holder 800 rotates integrally with the seal cap 330.

As shown in FIG. 3A, in the seal cap 330, the cylindrical rib 313 of the upper lid 300 moves in the annular groove 336 and engages with the circumferential formed diameter expansion step 337 of the inner wall 333 of the seal cap 330, so that in this portion, rotational frictional heat is generated and resin between contact surfaces melts.

Further, by rotating and also moving down the rotary holder 800, the cylindrical rib 313 of the upper lid 300 gradually moves in the annular groove 336 of the seal cap 330 and is welded as shown in FIG. 3B.

As described above, in the case of performing spin welding, burrs flowing out in a top direction of the cylindrical rib 313 among burrs melted by the spin welding and discharged from a joint surface are contained in the annular groove 336 of the seal cap 330.

Also, burrs flowing out in a base direction of the cylindrical rib 313 collect in the burr receiving groove 319 provided in the inner circumference of the cylindrical rib 313 and finally are contained by the lower end of the inner wall 333 of the seal cap 330.

Therefore, in the invention of the present application, the burrs are prevented from flowing out in the inner circumference or the outer circumference of the seal cap 330 and when the float valve 400 blocks the air vent 331, an accident such as a situation in which pinching is performed between both the contact surfaces can be prevented.

Incidentally, in the present embodiment, a melting part has been provided in an inner wall of a double wall made of the inner wall 333 and the outer wall 334 as a cylindrical part fitting in a rib, but the melting part may be provided in an outer wall of the double wall and also, either an inner wall or an outer wall may be formed to provided the melting part therein.

The invention can be utilized suitably for manufacture of, for example, a float valve apparatus which is mounted in a fuel tank of an automobile etc. and lets off vapor inside the fuel tank and also prevents an outflow of fuel when a liquid level inside the fuel tank rises.

What is claimed is:

1. A method of manufacturing a float valve apparatus which includes a valve case, an upper lid attached to the valve case to define a valve chamber, and a float valve liftably arranged under the valve chamber, the method comprising:
    forming an exhaust hole, which communicates with a lead-out pipe of the upper lid, in an inner surface of the upper lid;
    inserting a seal cap, provided separately from the upper lid, to the upper lid such that the seal cap surrounds the exhaust hole and has a valve seat on which the float valve abuts;
    spin-welding the seal cap to the upper lid; and
    providing the valve case on the upper lid so that the seal cap, spin-welded on the inner surface of the upper lid, is enclosed within the valve chamber, wherein the seal cap is spin-welded to the upper lid before the valve case is provided.

2. The method of manufacturing a float valve apparatus according to claim 1, further comprising:
    providing a first cylindrical rib on the upper lid; and
    engaging the first cylindrical rib with a step portion formed on the seal cap.

3. The method of manufacturing a float valve apparatus according to claim 2, further comprising:
    inserting the first cylindrical rib into an annular groove formed on the seal cap.

4. The method of manufacturing a float valve apparatus according to claim 3, further comprising:
    contacting the first cylindrical rib of the upper lid in the annular groove; and
    engaging the first cylindrical rib with the step portion on the seal cap, such that a resin material between the contacting surfaces melts during spin welding.

5. The method of manufacturing a float valve apparatus according to claim 4, further comprising:
    containing burrs flowing out of the first cylindrical rib in the annular groove.

6. The method of manufacturing a float valve apparatus according to claim 3, further comprising:
    installing the upper lid on a positioning jig of a spin welding apparatus; and
    incorporating the seal cap by fitting the annular groove into the first cylindrical rib.

7. The method of manufacturing a float valve apparatus according to claim 2, further comprising:
    providing a second cylindrical rib outside of the first cylindrical rib on the inner surface of the upper lid.

8. The method of manufacturing a float valve apparatus according to claim 7, further comprising:
    providing a plurality of tongues in a circumferential direction of the second cylindrical rib that project from the inner surface of the upper lid.

9. The method of manufacturing a float valve apparatus according to claim 2, further comprising:
    forming protrusions on a surface of the step portion on the seal cap.

10. The method of manufacturing a float valve apparatus according to claim 1, further comprising:
    providing protrusions on the seal cap; and
    engaging the protrusions with a rotary holder of a spin welding device.

11. The method of manufacturing a float valve apparatus according to claim 10, further comprising:
    engaging the protrusions on the seal cap with protrusions on a spin welding apparatus.

12. A method of manufacturing a float valve apparatus which includes a valve case, an upper lid attached to the valve case to define a valve chamber, and a float valve liflably arranged under the valve chamber, the method comprising:
    forming an exhaust hole in an inner surface of the upper lid so as to communicate to a lead-out pipe of the upper lid;
    forming a seal cap provided separately from the upper lid, the seal cap including:
        inner and outer cylindrical walls defining an annular groove therebetween; and
        a valve seat on which the float valve abuts; and
    providing the seal cap onto the inner surface of the upper lid so that a first cylindrical rib is fitted into the annular groove;
    spin-welding the seal cap to the upper lid;
    providing the valve case on the upper lid so that the seal cap, spin-welded on the inner surface of the upper lid, is enclosed within the valve chamber, wherein the seal cap is spin-welded to the upper lid before the valve case is provided.

13. The method of manufacturing a float valve apparatus according to claim 12, further comprising:
    providing the first cylindrical rib on the upper lid; and
    engaging the first cylindrical rib with a step portion formed on the seal cap.

14. The method of manufacturing a float valve apparatus according to claim 13, further comprising:
    providing a second cylindrical rib outside of the first cylindrical rib on the inner surface of the upper lid.

15. The method of manufacturing a float valve apparatus according to claim 12, further comprising:
    forming the first cylindrical rib for enclosing the exhaust hole in the inner surface of the upper lid;
    providing a circumferential wall for fitting into the cylindrical rib in the seal cap; and
    providing a melting part melted in the case of the spin welding in a surface of contact between the cylindrical rib of the upper lid and the circumferential wall of the seal cap.

16. The method of manufacturing a float valve apparatus according to claim 12, further comprising:
    providing a double cylindrical wall for enclosing a rib of the upper lid in a circumferential wall of the seal cap; and
    providing a melting part in either an inner wall or an outer wall of the double cylindrical wall.

17. The method of manufacturing a float valve apparatus according to claim 12, further comprising:
    providing protrusions on the seal cap; and
    engaging the protrusions with a rotary holder of a spin welding device.

* * * * *